United States Patent [19]

Pattavina

[11] Patent Number: 4,870,641
[45] Date of Patent: Sep. 26, 1989

[54] MULTICHANNEL BANDWIDTH ALLOCATION

[75] Inventor: Achille Pattavina, Rome, Italy

[73] Assignee: Bell Communications Research, Inc., Livingston, N.J.

[21] Appl. No.: 175,239

[22] Filed: Mar. 30, 1988

[51] Int. Cl.[4] ............................. H04J 3/17; H04J 3/26
[52] U.S. Cl. ........................................ 370/60; 370/94.1
[58] Field of Search ..................... 370/60, 94, 54, 58

[56] References Cited

U.S. PATENT DOCUMENTS

| | | | |
|---|---|---|---|
| 4,630,260 | 12/1986 | Toy et al. | 370/60 |
| 4,696,000 | 9/1987 | Payne, III | 370/60 |
| 4,734,907 | 3/1988 | Turner | 370/94 |
| 4,761,781 | 8/1988 | Calvignac et al. | 370/79 |
| 4,769,810 | 9/1988 | Eckberg, Jr. et al. | 370/60 |

*Primary Examiner*—Douglas W. Olms
*Assistant Examiner*—Min Jung
*Attorney, Agent, or Firm*—James W. Falk

[57] ABSTRACT

A method and apparatus for allocating bandwidth in a broadband packet switching network are disclosed. The invention utilizes channel groups (112) which may be defined as a set of parallel packet channels that act as a single data link connection between packet switches (110). In accordance with the invention, bandwidth is allocated in two steps. At virtual circuit setup time, bandwidth is reserved in particular channel groups. At transmission time packets are assigned to individual channels within the groups, illustratively, using a coordination mechanism in communication with the input ports of the appropriate packet switch. The bandwidth allocation technique, known as multichannel bandwidth allocation, leads to increased throughput and reduced packet loss probabilities.

22 Claims, 7 Drawing Sheets

FIG. 2

FIG. 3A
TABLE $K_a$

| LOGICAL | PHYSICAL |
|---------|----------|
| 0 | 4 |
| 1 | 3 |
| 2 | 5 |
| 3 | 6 |
| 4 | 2 |
| 5 | 7 |
| 6 | 0 |
| 7 | 1 |

FIG. 3B
TABLE $K_c$

| GROUP # | MAXOFF |
|---------|--------|
| 0 | 0 |
| 1 | 1 |
| 3 | 0 |
| 4 | 2 |
| 7 | 0 |

MULTICHANNEL BANDWIDTH ALLOCATION

FIELD OF THE INVENTION

The present invention relates to a broadband packet switching network and, more particularly, to a method for allocating bandwidth in such a network.

BACKGROUND OF THE INVENTION

A packet switching network comprises an array of packet switches interconnected by packet channels. Each packet channel connects two such packet switches. Typically, packets are routed through the network synchronously in time slots.

A packet switch in a broadband packet switching network is expected to have a throughput of several tens of Gigabits per second. An example of such a packet switch is described in "Batcher-Banyan Packet Switch With Output Conflict Resolution Scheme", U.S. patent application Ser. No. 919,793 filed for E. Arthurs and J. Hui on Oct. 16, 1986 and assigned to the assignee hereof, now U.S. Pat. No. 4,817,084, issued Mar. 28, 1989.

To cope with high bit rate data streams, the lower layer communications protocols must be simplified. Simplification is achievable because of the high speed and low error rate qualities of fiber optic links. Dynamic Time Division Multiplexing (see e.g., "Dynamic Time Division Multiplexing", U.S. patent application Ser. No. 118,977, filed on Nov. 10, 1987 for H. J. Chao, S. H. Lee and L. T. Wu and assigned to the assignee hereof) and Asynchronous Time Division Multiplexing (see e.g., T. A. Coudreuse, J. P. Servel "Asynchronous Time-Division Techniques: An Experimental Packet Network Integrating Video Communications. Proceedings of International Switching Symposium, Florence, Italy, 1984 paper 32.C.2.). provide simple data link layer protocols for broadband packet switching networks.

However, high throughput switches and efficient data link protocols alone do not guarantee an effective transport system. It is important to be able to allocate bandwidth so that resources are efficiently utilized and congestion is kept under control. This is a difficult problem because the traffic characteristics of potential broadband services are uncertain and the capacity of each packet channel has an upper bound related to technology limits (i.e. the maximum bit rate allowed by current technology) and to processing requirements per packet (e.g. the time required for a switch or a multiplexer to process a packet, typically on the order of a few microseconds). Furthermore, the peak rate of traffic sources varies by several orders of magnitude, with peak demands that may approach or exceed the capacity of a single packet channel. Thus additional protocols are needed to support service rates that exceed the capacity of a single packet channel.

In a packet network, connections between specific users are achieved by means of virtual circuits. Each virtual circuit typically passes through a plurality of packet switches and packet channels therebetween. A virtual circuit has to be set up before the transfer of user information takes place via the virtual circuit. To set up a virtual circuit, an appropriate amount of bandwidth is reserved for the virtual circuit in the particular packet channels and packet switches comprising the virtual circuit.

More particularly, to set up a virtual circuit in a packet network, a sequence of connections between pairs of packet switches is established. Upon receiving a connection request, a packet switch $S_1$ acts as follows. According to a routing strategy such as Dynamic Non-Hierarchical Routing, the packet switch $S_1$ chooses the next adjacent packet switch $S_2$ in the virtual circuit. Then, out of the set of packet channels connecting the packet switches $S_1$ and $S_2$ a particular packet channel is chosen for the virtual circuit depending for example on the bandwidth already reserved on the packet channels between switches $S_1$ and $S_2$ and the expected traffic characteristics of the new connection.

A classical problem is the optimal allocation of virtual circuits to specific channels of a transmission facility to improve throughput and reduce delay. This becomes a critical issue when the peak rate of a traffic source is close to the channel capacity. An allocation policy that uniformly books (and loads) the packet channels between two adjacent packet switches minimizes the average delay for each connection but penalizes the establishment of high bandwidth connections because the requested bandwidth is likely to exceed the residual usable capacity of each single channel. Alternatively, a scheme assigning a virtual connection to the fullest channel that can accommodate the new bandwidth request minimizes the blocking probability of high-peak throughput sources, but does not optimize delay.

In view of the foregoing, it is an object of the present invention to provide a more efficient method for allocating bandwidth in a broadband packet switching network.

SUMMARY OF THE INVENTION

The present invention is a method for allocating bandwidth in a packet switching network. In accordance with the present invention, a channel group may be defined as a set of parallel packet channels that acts as a single data link connection between two cooperating packet switches. (A similar concept known as a trunk group is described in J. Turner, U.S. Pat. No. 4,374,907, issued on Mar. 29, 1988).

In accordance with the present invention, bandwidth in a packet network is allocated in two steps, at connection setup time and at transmission time. At conection setup time (i.e. when a virtual circuit is set up) bandwidth is reserved for the virtual circuit on the appropriate channel groups connecting specific pairs of packet switches. At transmission time, packets to be transmitted via particular channel groups are assigned to individual packet channels within the appropriate channel groups. More particularly, at transmission time each packet present at an input port of a packet switch and addressed to a particular outgoing channel group is assigned or allocated to an individual channel within the group. Note that in a particular embodiment, the bandwidth allocation scheme may require coordination between the input ports of a packet switch. Such coordination may be achieved by a central entity associated with the packet switch which collects the channel group requests of the input ports and allocates to the input ports specific channels in the requested channel groups.

Thus, in accordance with the present invention, virtual circuits are set up by reserving bandwidth in particular channel groups (multichannel bandwidth allocation). This is to be compared with the conventional prior art technique whereby virtual circuits are set up by reserving bandwidth in individual channels (unichannel bandwidth allocation). In accordance with the present invention, it is only after a virtual circuit is set up and at transmission time that data packets are assigned to individual packet channels.

The multichannel bandwidth allocation scheme provides several significant advantages. Due to the pooling effect, a channel group can support a greater number of sources than its channels could individually. Because of the statistical smoothing of the large number of sources served by a channel group, the total instantaneous load offered to a channel group is not likely to vary greatly from the average offered load. Thus, the capacity reserved for a virtual circuit using multichannel bandwidth allocation can be kept closer to the average load of the virtual circuit than in the traditional unichannel bandwidth allocation scheme wherein channel assignments must take greater account of the maximum possible load of a virtual circuit. The relatively slight impact on a channel group of a burst from a particular source makes assignment of a source to a particular channel group less a critical problem. In addition, the multichannel bandwidth allocation scheme enables super rate switching. This means that virtual circuits having a bit rate greater than the capacity of a single channel are provided for, since each virtual circuit is assigned to particular channel groups and not individual packet channels.

The multichannel allocation scheme increases the maximum throughout per port of a packet switch. For example, an input port buffered switch whose input ports are uniformly loaded by packet streams characterized by random output port destination has a maximum throughput per port of about 0.59 when the conventional unichannel bandwidth allocating scheme is used. Throughput is defined as the ratio of the average channel traffic to the maximum channel capacity. In contrast, when channel groups comprising 32 individual channels are utilized in accordance with the present invention the throughput is in excess of 0.9. Finally, in the case of bursty sources the multichannel bandwidth allocation technique leads to a reduction in packet loss probably of several orders of magnitude in comparison with a system utilizing unichannel bandwidth allocation.

DETAILED DESCRIPTION OF THE INVENTION

A. OVERVIEW OF MULTICHANNEL BANDWIDTH ALLOCATION

Figure 1:
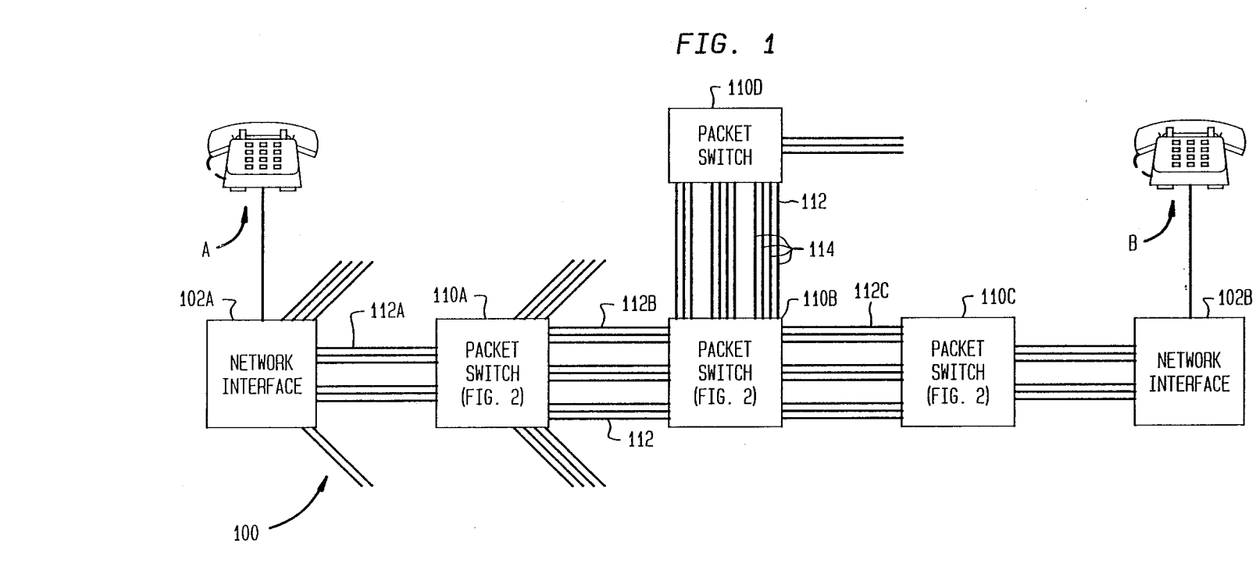
FIG. 1 schematically illustrates a packet network in which bandwidth is allocated in accordance with the multichannel bandwidth allocation procedure of the present invention.

A packet network 100 which allocates bandwidth in accordance with the multichannel bandwidth allocation scheme of the present invention is illustrated in FIG. 1. The network of FIG. 1 comprises an array of packet switches including packet switches 110A, 110B, 110C, 110D. A packet switch 110 is shown in more detail in FIG. 2 and discussed in more detail in section B below. The network interfaces 102A and 102B serve to interface users A and B, respectively, with the network.

The network interfaces and packet switches are interconnected by channel groups 112. A channel group may be defined as a set of parallel packet channels that acts as a single data link between two cooperating routing entities such as packet switches. Thus for example there are three channel groups between switches 110A and 110B and there are two channel groups between network interface 102A and switch 110A.

In FIG. 1, the channel groups 112 are shown as each comprising a group of physically adjacent individual packet channels 114. However, through use of a logical addressing technique discussed below, the channel groups may be formed from individual channels which are not physically adjacent.

In the packet network 100 of FIG. 1, a connection between two users such as A and B is achieved by means of a virtual circuit. One example of a virtual circuit between users A and B comprises network interface 102A, channel group 112A, switch 110A, channel group 112B, switch 110B, channel group 112C and network interface 102B.

In accordance with the present invention, the bandwidth of a channel group is allocated in two steps, at connection setup time and at transmission time. At connection setup time (i.e. when a virtual circuit is set up) an appropriate amount of bandwidth is reserved in the channel groups comprising the virtual circuit. At transmission time, packets to be transmitted via particular channel groups are assigned to specific individual packet channels within the appropriate channel group. More particularly, packets present at the input ports of a particular packet switch and addressed to particular outgoing channel groups are assigned to specific individual channels within the groups.

To set up a virtual circuit in the network 100, a sequence of connections between pairs of packet switches is established. Upon receiving a connection request a packet switch such as a packet switch 110A acts as follows:

(1) According to a particular routing strategy, a switch such as switch 110A selects the next adjacent switch in the virtual circuit, e.g. switch 110B. (An example of a routing strategy at the network layer level is Dynamic Non-Hierarchical Routing).

(2) Within the set of channel groups between switches 110A and 110B, a specific channel group, say 112B, is selected that can accommodate the new connection request; such a choice being based on the current value of the bandwidth already reserved on each channel group between switches 110A and 110B.

(3) A bandwidth $W_i$ is then booked in channel group 112B for the connection being established; if no suitable channel group between 110A and 110B is available the switch 110A searches for an alternate route or rejects the call. $W_i$ is selected as a function of the channel group capacity, the traffic characteristics of the source, and the delay performance expected.

In the foregoing manner a virtual circuit may be set up in the network 100 of FIG. 1 between User A and User B. When virtual circuits are set up in the network 100 in this manner, packets arrive at the packet switches 110 containing a virtual circuit identifier which is mapped into the address of a particular outgoing channel group 112. The packet switches 110 serve to assign each incoming packet to a specific packet channel in the channel group to which the packet is addressed. The packet switches 110 also serve to route the incoming packets to the specific output channels. For example, a data packet to be transmitted via the virtual circuit between A and B arrives at switch 110A via a channel in channel group 112A and is provided with the address of outgoing channel group 112B. The switch 110A assigns this packet to a particular channel in channel group 112B and then routes this packet to the particular assigned channel in channel group 112B. A packet switch capable of accomplishing these tasks is discussed in the immediately following sections.

B. PACKET SWITCH FOR MULTICHANNEL BANDWIDTH LOCATION

Figure 2:
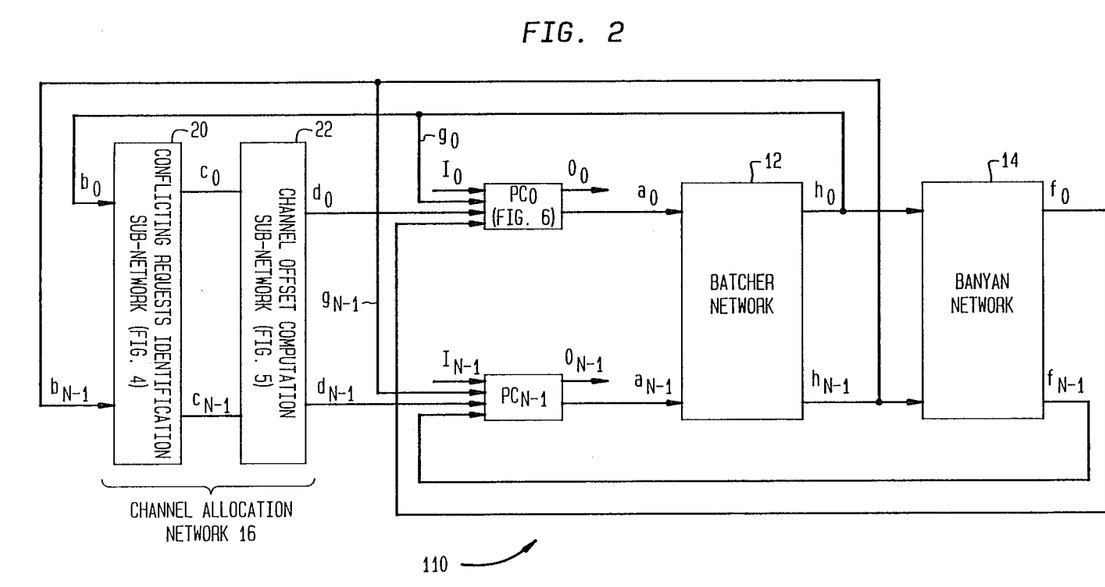
FIG. 2 schematically illustrates a packet switch capable of carrying out the multichannel bandwidth allocation procedure in accordance with an illustrative embodiment of the present invention.

A packet switch 110 capable of allocating bandwidth in accordance with the multichannel bandwidth allocation scheme of the present invention is illustrated in FIG. 2.

The packet switch 110 of FIG. 2 comprises a Batcher network 12 followed by a banyan network 14. Packets arriving at the Batcher network 12 via the lines $a_0 \ldots a_{N-1}$ are sorted according to a self-routing address at the head of each packet. An ordered set of packets with non-decreasing or non-increasing self-routing addresses is obtained at contiguous outputs of the Batcher network via the lines $h_0 \ldots h_{N-1}$. The banyan network 14 is a self-routing network adapted to route packets present at its inputs to the specific output addresses contained in the packet headers. In the banyan network, only one path exists between any input and output. Different paths corresponding to different input and output pairs may share internal links so that there may be packet collisions within the banyan network. However, packet collisions will not occur if the incoming packets have different self-routing addresses and are offered as an ordered set to a contiguous set of inputs of the banyan network. Hence, a combined Batcher-banyan network provides an internally non-blocking, full access switching network if the packets entering the inputs of the Batcher network are addressed to different outputs of the banyan network.

Figure 6:
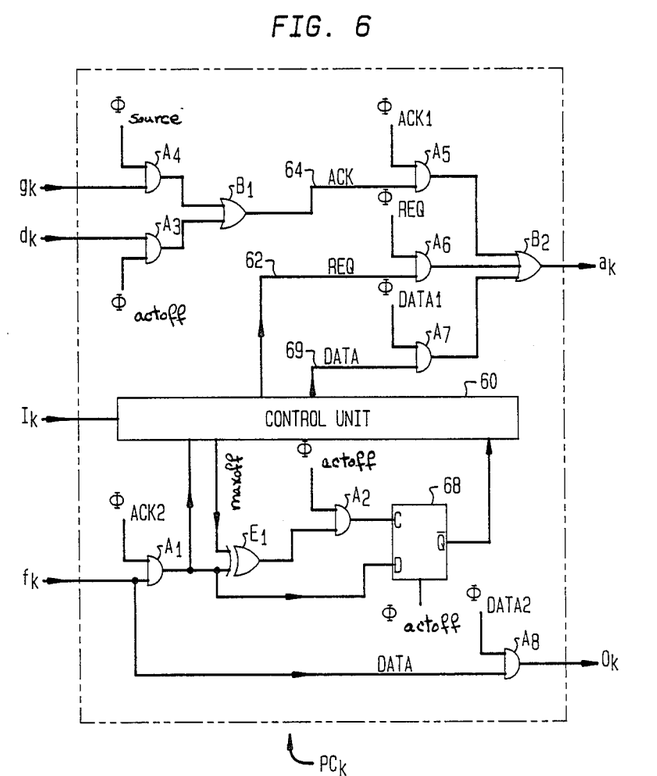
FIG. 6 schematically illustrates a port controller for use in the packet switch of FIG. 2.

In addition to the Batcher-banyan network 12, 14, the packet switch 110 of FIG. 2 comprises a plurality of port controllers $PC_0 \ldots PC_{N-1}$. The circuitry of a port controller is illustrated in FIG. 6 and is discussed in section G below. The output lines or output packet channels of the switch 110 are designed $O_0 \ldots O_{N-1}$. Each of the output channels $O_0 \ldots O_{N-1}$ is connected to an associated port controller $PC_0 \ldots PC_{N-1}$. The output channels $O_0 \ldots O_{N-1}$ are organized into channel groups as shown in FIG. 1. Each of the output channel groups connects the packet switch 110 with another packet switch or with a network interface.

In accordance with the multichannel bandwidth allocation technique of the present invention, at call setup time, a virtual circuit passing through the packet switch 110 of FIG. 2, is assigned some bandwidth in the appropriate input packet channel group (not shown) and output packet channel group.

When virtual circuits are set up in the manner indicated above, each packet arriving at the switch 110 includes a virtual circuit identifier indicating the virtual circuit to which the packet belongs. A packet processor (not shown in FIG. 2) maps the virtual circuit identifier into the address of an outgoing channel group. Thus, each incoming packet present on one of the input lines $I_0 \ldots I_{N-1}$ contains the address of an output channel group. Each of the input lines $I_0 \ldots I_{N-1}$ is connected to an associated port controller $PC_0 \ldots PC_{N-1}$. It is the role of the packet switch 110 to assign to each incoming packet on lines $I_0 \ldots I_{N-1}$ an outgoing channel in the appropriate output channel group and to route each packet to the assigned output channel.

Figure 4:
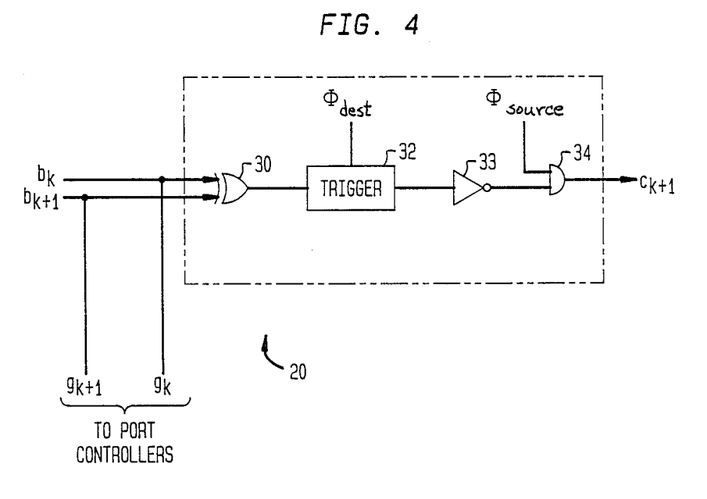
FIGS. 4 and 5 illustrate two sub-networks comprising part of the packet switch of FIG. 2.
Figure 5:
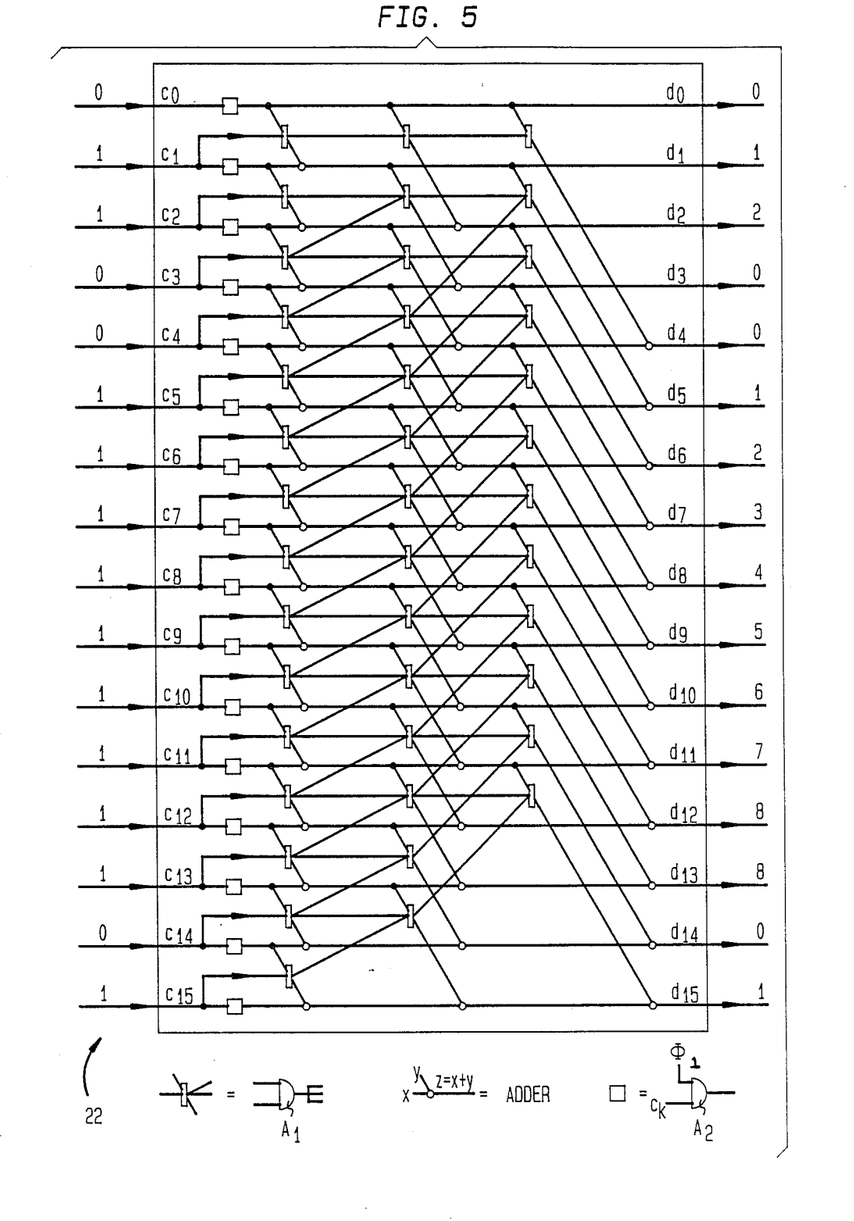

The channel assignment function of the packet switch 110 is performed by the channel allocation network 16. The channel allocation network 16 comprises a conflicting requests identification sub-network 20 and a channel offset computation sub-network 22. The conflicting requests identifying sub-network 20 is illustrated in FIG. 4 and discussed in section E below. The channel offset computation sub-network 22 is illustrated in FIG. 5 and discussed in section F below.

The routing function of the packet switch 110 is performed by the Batcher-banyan network 12, 14. The Batcher-banyan network is conventional and is not discussed in detail herein. It should be noted that input packets arrive synchronously in slots at the port controllers $PC_0 \ldots PC_{N-1}$.

C. OUTPUT CHANNEL ASSIGNMENT ALGORITHM

A three-phase algorithm may be used to carry out the output channel assignment and routing function of the packet switch 110. In phase I, each port controller with a data packet sends a request to engage a channel of the outgoing channel group indicated in the data packet. These requests are sorted in non-descending order by the Batcher network 12, so that requests for the same channel group are adjacent at the outputs of the Batcher network. This allows the channel allocation network 16, to compute an index for each request that identifies a particular channel in the appropriate output channel group. Those requests that cannot be accommodated in a particular channel group (e.g. because the number of requests for the channel group exceeds the number of channels in the group) are given an index corresponding to a channel that does not belong to the group requested. In phase II, each assigned index is used to form an acknowledgement packet which is transmitted back to the requesting port controller via the Batcher-banyan network. Each requesting port controller determines if it won the contention for the requested output channel group based on the capacity of the channel group requested and the index received. In phase III, the winning port controllers transmit their packets through the Batcher-banyan network to the appropriate output channel destinations. This three-phase algorithm is discussed in detail below.

First, however, it should be noted that in a switch supporting multichannel bandwidth allocation, it is desirable that the addresses of channels of the same group be consecutive. However, such a physical constraint on the output channels could seriously constrain a change of the configuration of the interswitch communication facilities, e.g., following a channel failure or an updating in the expected traffic patterns. For this reason a logical addressing scheme is introduced for the output channels. This logical addressing scheme decouples each output channel address from the physical address of the associated port controller.

Each output channel is assigned a logical address, so that a channel group is composed of channels with consecutive logical addresses. There is a one-to-one correspondence between the output channel logical address and the physical addresses of the associated port controllers. The channel with the lowest logical address in a group is the group leader. The group leader logical address also represents the group address. A specific channel in a group is identified by a channel offset given by the difference between the specific channel logical address and the group leader logical address. Each port controller is provided with two tables $K_a$ and $K_c$. $K_a$ maps each logical address to the associated physical address (i.e. the associated port controller address) of each output channel. $K_c$ specifies the maximum value, maxoff(j), allowed for the channel offset in channel group j. Examples of the tables $K_a$ and $K_c$ are found in FIGS. 3A and 3B, respectively.

In the discussion which follows, the number of input channels and the number of output channels of the packet switch 110 of FIG. 2 of N. The number of output channel groups is designated by the letter G and $D_i$ is the number of channels in group i which is referred to as the capacity of channel group i. Thus $$N = \sum_{i=1}^{G} D_i, \text{ and}$$

$$D_i = \text{maxoff}(i) + 1.$$

For simplicity it is assumed that $D_{max}$ is the maximum capacity allowed for a channel group and that N is a power of two. Let n and d denote the number of bits needed to code the logical address of a channel (or the physical address of a port controller) and the channel offset respectively. Thus, $n = \log_2 N$ and, in accordance with the three-phase output channel assignment algorithm to be described in detail below, $d = [1 + \log_2 (D_{max})]$ where [x] is the least integer greater than or equal to the real x.

In phase I, a port controller $PC_i$ with a data packet to be transmitted to outgoing channel group j sends a request packet REQ(j,i). Each request packet contains, in order of transmission, the identifier j of the destination channel group to which the port controller $PC_i$ wishes to send a data packet and the physical address i of the sending port controller. As indicated above, the identifier j of the destination channel group is the logical address of the channel group leader. The request packets enter the channel allocation network 16 of switch 110 of FIG. 2 via the lines $b_0 \ldots b_{N-1}$ after being sorted by the Batcher network 12 in non-decreasing order according to the destinations j. As indicated above and as shown in FIG. 2, the channel allocation network 16 comprises two sub-networks. The conflicting requests identification sub-network 20 receives a set of request packets REQ(j,i) from the Batcher network 12 sorted according to channel group destination address j on line $b_0 \ldots b_{N-1}$ and identifies requests for the same channel group. As indicated above, there is no guarantee that the number of requests for a group does not exceed the number of channels in the group.

The channel offset computation sub-network 22 assigns an actual offset, actoff(j), to each request for group j, to spread the requests for group j over all the channels of group j. Each offset belonging to the interval $[0, D_{max-1}]$ is assigned to only one request for output channel group j, while other requests for the same group are given an offset actoff(j) > $D_{max}$. Since maxoff(j) ≤ $D_{max-1}$, each channel of group j is allocated to only one request for group j. Then, the actoff(j) value present at the channel allocation network 16 output line $d_k(k=0 \ldots N-1)$ is transmitted to the port controller $PC_k$. The port controller $PC_k$ combines the source field i of the request packet REQ(j,i) present on line $b_k$ with the actoff(j) value present on line $D_k$ to form an acknowledgement packet ACK(i,actoff(j)). Note that the source field of the request packet on line $b_k$ is transmitted to the port controller $PC_k$ via the line $g_k$.

In phase II of the output channel assignment algorithm, the acknowledgement packet ACK(i,actoff(j)) is reentered into the Batcher network 12 from the port controller $PC_k$ and is routed through the Batcher and banyan networks with the self-routing address i. The packets ACK ( ... ) do not collide with each other in the Batcher-banyan network since there is no more than one acknowledgement packet ACK(i,actoff(j)) addressed to each output of the banyan network. Each acknowledgement packet ACK(i,actoff(j)) emerges from the banyan network on line $f_i(i=0 \ldots N-1)$ and is routed via the line $f_i$ to the port controller $PC_i$. Port controller $PC_i$, receiving ACK(i,actoff(j)), has thus been given an actoff(j), i.e. an actual offset which may or may not correspond to a member of channel group j depending on the value of maxoff(j) which value indicates the capacity of channel group j. This completes phase II of the output channel assignment algorithm.

In phase III, if actoff(j) ≤ maxoff(j), port controller $PC_i$ sends its data packet DATA(p(j+actoff(j))) to the port controller whose physical address p(x) is mapped by table $K_a$ (see FIG. 3A) to the channel logical address $x = j + \text{actoff}(j)$. Packets DATA(p(x)) cross the Batcher-banyan network without collisions, since the winning requests have been assigned different output logical addresses, and, hence, different physical addresses of destination port controllers. If actoff(j) > maxoff(j), the port controller waits for the start of the next transmission cycle to issue a new request for its packet, which remains stored in an input queue.

D. ILLUSTRATIVE EXAMPLE OF THE OUTPUT CHANNEL ASSIGNMENT ALGORITHM

Figure 3A:
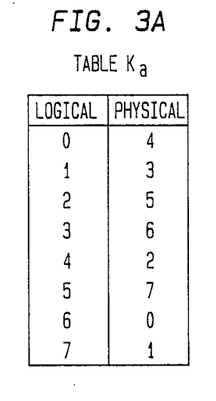
FIGS. 3A, 3B, 3C, and 3D schematically illustrate an example of the multichannel bandwidth allocation procedure as carried out by the packet switch of FIG. 2.
Figure 3B:
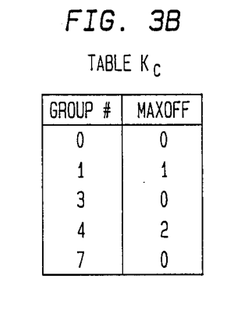
Figure 3C:
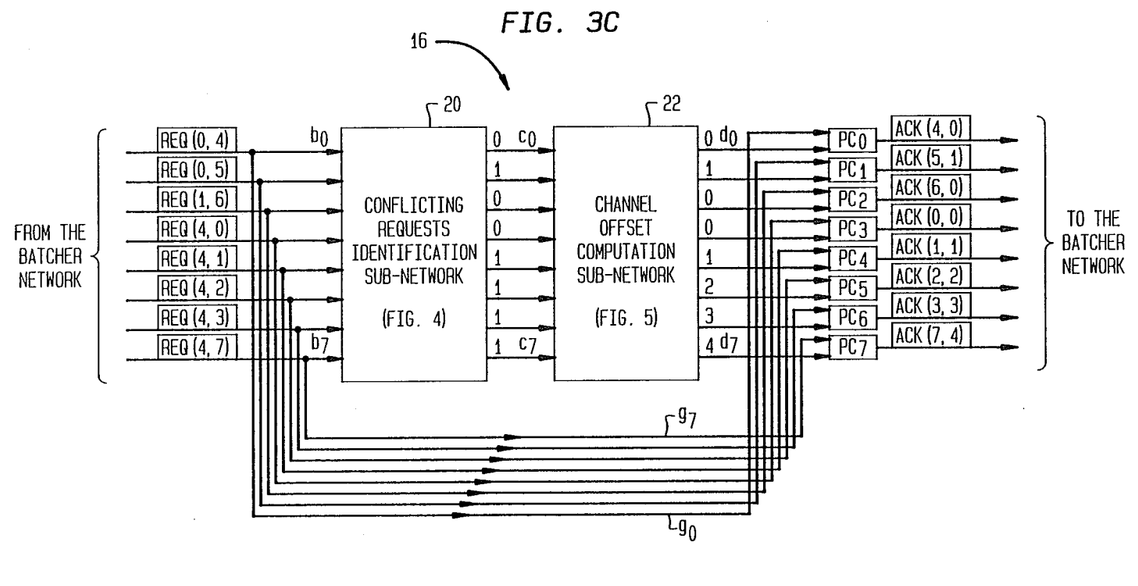
Figure 3D:
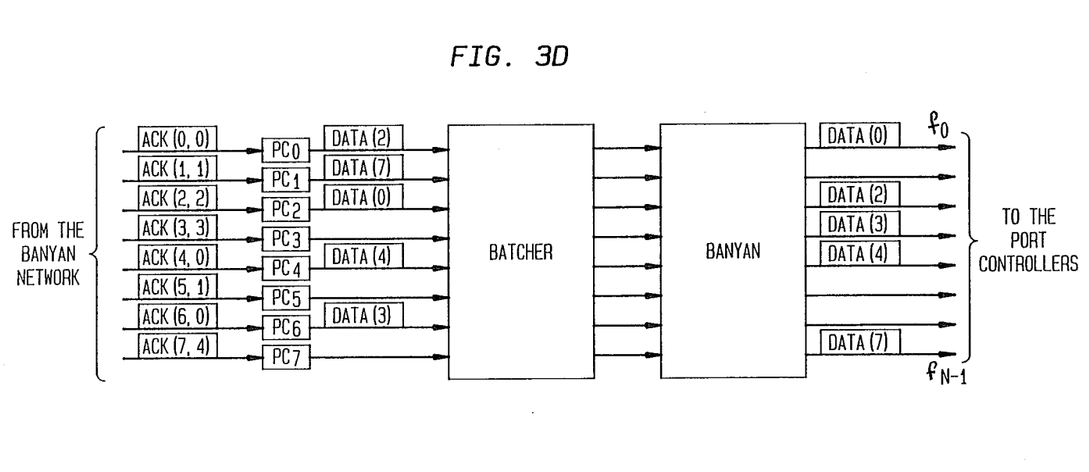

An example of the operation of the switch 110 of FIG. 2 for assigning individual output channels to packets addressed to channel groups is schematically illustrated in FIGS. 3A, 3B, 3C and 3D. FIG. 3A is an example of the above-mentioned table $K_a$ present in each port controller. The table $K_a$ of FIG. 3A provides a logical-to-physical address mapping of the output channels $O_0 \ldots O_{N-1}$. Thus, the output channel with logical address "0" has physical address "4". FIG. 3B is an example of the above-mentioned table $K_c$ present in each port controller. The table $K_c$ of FIG. 3B shows the output channel group capacities. FIG. 3C shows the channel allocation network 16 and the port controllers of the switch 110 of FIG. 2. FIG. 3D shows the port controllers and Batcher-banyan portion of the switch 110 of FIG. 2. In FIGS. 3A, 3B, 3C and 3D, N=8 and the maximum capacity of a channel group is three individual channels.

As shown in FIGS. 3A and 3B the N=8 output channels are arranged in five channel groups. The channel in each group with the lowest logical address is the group leader. The group leader logical address also represents the group address. Thus, as shown in FIG. 3B, the five channel groups are each identified by the logical address of the group leader. FIG. 3B also includes the maximum offset (maxoff) of each group. As indicated above, the offset of a particular output channel is the difference between the logical address of the particular output channel and the logical address of the group leader of the group to which the channel belongs. For example, Group #4 has a maximum offset or maxoff of 2. This means that Group #4 comprises three channels i.e. the channels with the logical address $4+0=4$, $4+1=5$, and $4+2=6$. Similarly, group #1 has a maxoff of 1 which means that the group 1 comprises 2 channels i.e. the channels with the logical addresses $1+0=1$ and $1+1=2$.

As previously discussed, in phase I of the output channel assignment algorithm, each port controller $PC_i$ having a data packet to transmit to output channel group j generates a request packet REQ(j,i). These request packets are sorted in non-decreasing order according to destination address j in the Batcher network (12 of FIG. 2). The request packets, sorted by destination address, are then offered to the conflicting requests identification sub-network 20 of the channel allocation network 16. A set of such sorted request packets is shown at the inputs to the channel allocation network 16 of FIG. 3C, i.e. at the left-hand side of FIG. 3C. As can be seen by looking at the request packets there are two requests for group #0, one request for group #1, and five requests for group #4. Note, the number of requests for group #4 exceeds the capacity of group #4.

In the conflicting requests identification sub-network 20 of FIG. 3C, requests for the same channel group are identified. Each destination address is compared with the destination address in the request packet on the line above it. If the destination address in a request packet on line $b_{k+1}$ ($k=0 \ldots N-2$) is equal to the destination in a request packet on line $b_k$ ($k=0 \ldots N-2$) then the output of the conflicting requests identification sub-network on line $C_{k+1}$ ($K=0 \ldots N-2$) is a logic "1". If the addresses are not equal, the output of the conflicting requests identification sub-network on line $c_{k+1}$ ($k=0 \ldots N-2$) is a logic "0". The output on the uppermost line $C_0$ is always logic "0". The outputs of the conflicting requests identification sub-network as derived from the request packets of the present example are shown adjacent the lines $C_0 \ldots C_7$ in FIG. 3C. Thus the conflict identifications for group #0 appear on lines $c_0$, $c_1$ and the conflict identifications for group #4 appear on lines $c_3$, $c_4$, $c_5$, $c_6$ and $c_7$. There are no conflicts for group #1 as indicated by the zero on line $C_2$ and by the zero on line $C_3$.

The channel offset computation sub-network of FIG. 3C, utilizes the values on lines $C_0 \ldots C_7$ to compute the actual offsets (actoff(j)). The actual offsets are used to spread the requests for a given channel group over the channels in the group in a manner so that the offsets for each particular group are assigned only once. The channel offset computation sub-network is a running adder network. More particularly, the actual offsets are arrived at by calculating a running sum of the outputs of sub-network 20 for each channel group. The channel offset computation sub-network "knows" the boundaries between the channel groups as each logic "0" on lines $c_0 \ldots c_{N-1}$ indicates the start of the offsets for a new channel group (and hence the start of a new sequence of running sums). These running sums appear on lines $d_0$ to $d_{N-1}$ (N=8) of FIG. 3C and represent the actual offsets which are added to the group addresses to obtain the individual output channel addresses.

The actual offsets are then transmitted to the port controllers $PC_0 \ldots PC_7$ via lines $d_0 \ldots d_7$. The port controllers then generate the acknowledgement packets ACK(i,actoff(j)) as follows. $PC_i$ combines the source field of the request packet arriving on line $b_i$ with the offset present on line $d_i$ ($=0 \ldots N-1$). For example, the request packet present on line $b_1$ is REQ(0,5) whose source is $PC_5$ and the offset present on line $d_1$ is 1. Thus, the acknowledgement packets produced by $PC_1$ is ACK(5,1). Note that the source fields of the request packets arriving on lines $b_0 \ldots b_{N-1}$ are transmitted to the port controllers via lines $g_0 \ldots g_{N-1}$ to form the acknowledgement packets. The full set of acknowledgement packets is shown at the right-hand side of FIG. 3C. This completes phase I of the channel assignment algorithm.

In phase II of the channel assignment algorithm, the acknowledgement packets (now located at the right-hand side of FIG. 3C) are routed through the Batcher-banyan network and then returned to the port controllers to that ACK(i,actoff(j)) is at $PC_i$. The acknowledgement packets, after being routed through the Batcher-banyan network and back to the port controllers, are shown at the left-hand side of FIG. 3D. This completes phase II of the channel assignment algorithm.

In phase III of the channel assignment algorithm, the port controllers $PC_i$ transmit the data packets DATA(p(j+actoff(j))) to the specific output channels p(j+actoff(j)) where p(x) is the physical address corresponding to the logical address x. The port controller $PC_i$ transmits its data packet if actoff(j)≦maxoff(j), otherwise the port controller $PC_i$ buffers its packet. In the present example, this condition is not satisfied by port controllers $PC_3$, $PC_5$, $PC_7$. For example, the request packet on line $b_7$ of FIG. 3C indicates that $PC_7$ wishes to transmit a data packet to channel group #4. As indicated in FIG. 3B, the maximum offset or maxoff value for channel group #4 is 2, while the actoff in the acknowledgement packet at $PC_7$ (FIG. 3D) is 4. Thus $PC_7$ cannot transmit its packet and it must buffer its packet so that it can try again during the next execution of the three phase channel assignment algorithm. On the other hand, $PC_0$, $PC_1$, $PC_2$, $PC_4$ and $PC_6$ transmit their data packets for routing through the Batcher-banyan network to the appropriate output channels. For example, as indicated by the request packet on line $b_3$, $PC_0$ has a packet addressed to channel group #4. The request packet on line $b_3$ is assigned an actual offset of zero. Thus, the logical address assigned to the packet to be transmitted by $PC_0$ is 4. This corresponds to a physical address of 2. Accordingly, the data packet from $PC_0$ is routed to the output channel having physical address #2. This completes phase III of the output channel assignment algorithm.

E. CONFLICTING REQUESTS IDENTIFICATION NETWORK

FIGS. 4, 5 and 6 schematically illustrate the conflicting requests identification sub-network, the channel offset computation sub-network, and a port controller, respectively. In the discussion that follows, $T_x$ denotes the transmission time of packet x or field x of a packet. For example, $T_{ACK}$ and $T_{dest}$ are the transmission times of packet ACK( . . . ) and the destination field of packet REQ( . . . ), respectively.

A portion of the conflicting requests identification sub-network 20 is shown in detail in FIG. 4. In particular, FIG. 4 schematically illustrates the logic associated with the input lines $b_k$, $b_{k+1}$ and the output line $c_{k+1}$ (k=0, . . . N-2) of the conflicting requests identification sub-network 20. The destination channel group identification numbers j of the request packets REQ(j, i) received on input lines $b_k$, $b_{k+1}$ are compared bit by bit by an EX-OR (exclusive or) gate 30, whose output sets the trigger 32 at the appearance of the first mismatched bits on input lines $b_k$, $b_{k+1}$. The trigger 32 keeps its status for a time not less than $2T_{dest}$ (i.e. twice duration of the destination field j) to allow the trunk offset computation sub-network 22 to complete the computation of the channel offset values. The trigger 32 is reset by the rising edge of signal $\phi_{dest}$ at the start of the address comparison carried out in the sub-network 20. An inverter 33 is connected at the output of trigger 32.

The AND gate 34 in sub-network 20 allows a delay in the start of computation of the trunk offset in sub-network 22 with respect to the end of address comparison in sub-network 20. A signal $\phi_{source}$ is high for a time $T_{source}$ and its rising edge occurs in $n-2^{[log_2(D_{max})]}$ bit times after the end of address comparison in the EX-OR gate 30. As $2^{[log_2(D_{max})]}$ is the signal latency in sub-network 22, the first bit of actoff(j) is generated by sub-network 22 just after the complete reception of the field source i in packet REQ(j, i) by the port controller $PC_k$ via line $g_k$ (see FIG. 2). This allows the port controller $PC_k$ to generate a packet ACK(i, actoff(j)), with the source field i transmitted first, without buffering either of the two fields composing ACK( . . . ).

The signal on output $c_{k+1}$ of FIG. 4 is logic "1" if the channel group identification number on line $b_{k+1}$ is equal to the channel group identification number of line $b_k$. If the channel group numbers on lines $b_k$ and $b_{k+1}$ are not equal, the output on line $c_{k+1}$ is logic "0". The signal on output line $c_0$ is always low, independent of the input signals to the sub-network 20, as is required by sub-network 22, which always gives actoff(j)=0 to the request packet received on line $b_0$.

F. CHANNEL OFFSET COMPUTATION SUB-NETWORK

. The channel offset computation sub-network 22 is shown in FIG. 5 for the case N=16 and $5 \leq D_{max} \leq 8$. The sub-network 22 is a running adder network. The outputs of the conflicting requests identification sub-network 20 are received on the lines $c_k$ (k=0 . . . N-1) and the actual offset values are transmitted via the lines $d_k$.

More particularly, the sub-network 22 comprises $s=[log_2(D_{max})]$ stages of adders. Each AND gate $A_2$ is enabled by the signal $\phi_1$ for one bit time so that the first stage adder connected to line $c_k$ receives the logic "0" or logic "1" value transmitted from the sub-network 20.

Based on the structure of sub-network 22, the output of each adder of stage z (z=1, 2, . . . , s) is smaller than or equal to $2^z$. This means that the output signal on any line $d_k$ is not greater than $2^s$. The AND gates $A_1$ serve to delimit groups of lines $d_k$. The groups are delimited so that the offset values start from zero for each channel group j. An example of the channel offset computation is provided in FIG. 5 in which 10 requests for the same channel group j are received on inputs $c_{4-13}$. As three stages of adders comprise the sub-network 22 of FIG. 5, two of the ten requests will be given the same actoff(j)=8. If $D_j$=6, then four requests for the channel group j, i.e. those received on ports $c_{10-13}$ lose the contention since they receive in actoff(j)<5.

G. PORT CONTROLLER

Operation of a port controller may be understood in connection with FIG. 6 which illustrates the port controller $PC_k$. Illustratively, the port controller $PC_k$ has a data packet to send to channel group j. This packet arrives on input channel $I_k$ and is stored in the control unit 60. In phase I of the output channel assignment algorithm, the port controller $PC_k$ sends a request packet REQ(j, k) to the Batcher network via the line $A_k$. The request packet REQ(j, k) is generated in the control unit 60 and is transmitted out of the port controller $PC_k$ via line 62, gate $A_6$ and gate $B_2$. The signal $\phi_{REQ}$ is high for the time $T_{REQ}$. After all the request packets are sorted by the Batcher network (See FIG. 2), the request packet REQ(l, i) appears on the line $b_k$ (see FIG. 2). The source field of request packet REQ(l, i) is received at port controller $PC_k$ on the line $g_k$ by gate $A_4$. Similarly, after the channel offsets are calculated by the channel offset network, actoff(l) is received on line $d_k$ by gate $A_3$ of the port controller $PC_k$. The signals $\phi_{source}$ and $\phi_{actoff}$ are high for times $T_{source}$ and $T_{actoff}$ respectively. The gate $B_1$ combines the source field, i and the offset actoff(l) to form the acknowledgement packet ACK(i, actoff(l)).

In phase II of the output channel assignment algorithm this acknowledgement packet is transmitted into the Batcher network via line 64, gates $A_5$ and $B_2$ and line $a_k$. The signal $\phi_{ACK1}$ is high for the time $T_{ACK}$. Also in phase II of the output channel assignment algorithm, the gate $A_1$ of the port controller $PC_k$ of FIG. 6 receives the acknowledgement packet ACK(k, actoff(j)) from an output of the Banyan network on line $f_k$. Signal $\phi_{ACK2}$, which is high for time $T_{ACK}$, enables the port controller $PC_k$ to receive the packet ACK(k, actoff(j)). While actoff(j) is being received, two different tasks are carried out: First, actoff(j) and j are summed to obtain the logical address of the output channel assigned to $PC_k$; and second actoff(j) and maxoff(j) are compared to verify that the channel assigned to $PC_k$ is a member of output channel group (j). The first task is an addition and may be performed inside the control unit 60. The second task is performed by comparing actoff(j) and maxoff(j) bit by bit in EX-OR gate $E_1$. At the start of the comparison, the signal $\phi_{actoff}$ enables the AND gate $A_2$ for the comparison time $T_{actoff}$ and clears the flip-flop 68 by its rising edge. This flip-flop stores the most significant bit of actoff(j) that is different from the corresponding bit of maxoff(j). When the comparison is over, the output $\bar{Q}$ of the flip-flop 68 is high, if actoff(j)$\leq$maxoff(j).

In phase III of the output channel assignment algorithm, a high signal on $\bar{Q}$ enables $PC_k$ to transmit its data packet DATA(p(j+actoff(j)) to the appropriate output channel. The data packet is transmitted from the control unit 60 to the physical address p(j+actoff(j)) corresponding to the logical address j+actoff(j) via line 69, gates $A_7$ and $B_2$, and the line $a_k$. The signal $\phi_{DATA1}$ is high for the time $T_{DATA}$. At the end of phase III, the data packet DATA(k), if any, is received at $PC_k$ via the line $f_k$ and transmitted to the output channel $O_k$ via gate $A_8$ which is enabled for the time $T_{data}$ by the signal $\phi_{DATA2}$.

H. CONCLUSION

In short, a bandwidth allocation scheme has been described. It is based on the definition of packet channel groups, whose capacity is not bounded by the capacity of a single broadband packet channel. This allows more efficient use of transmission and switching resources and permits super-rate switching. As shown herein, the bandwidth allocation scheme is feasible in a Batcher-banyan switch. The additional hardware utilized in the switch to handle channel groups negligibly increases switch inefficiency. For random traffic, the multichannel bandwidth allocation scheme of the present invention provides for a substantial increase in throughput as compared to the traditional unichannel bandwidth allocation scheme. For bursty traffic, channel groups reduce the packet loss probability by several orders of magnitude.

Finally, the above described embodiments of the invention are intended to be illustrative only. Numerous alternative embodiments may be devised by those skilled in the art without departing from the spirit and scope of the following claims.

What is claimed is:

1. A method for allocating bandwidth in a packet switching network comprising a plurality of packet switches interconnected by packet channels organized into channel groups, said method comprising
    setting up virtual circuits in said network by reserving bandwidth in one or more of said channel groups for each virtual circuit, and
    under the control of centralized coordination means in communication with the input ports of the appropriate one of said packet switches, assigning each packet to be transmitted via a particular channel group to an individual packet channel within the particular channel group and resolving conflicts if the number of packets to be simultaneously transmitted via a particular channel group exceeds the number of individual channels in the particular channel group.

2. The method of claim 1 wherein at one of said packet switches said setting up step comprises:
    selecting an adjacent packet switch, and
    within a set of channel groups connecting said one packet switch and said adjacent packet switch, selecting a channel group in said set that can accommodate the virtual circuit being set up.

3. A method for allocating bandwidth in a packet switch having output channels organized into channel groups, said method comprising the steps of
    at the time a virtual circuit passing through said switch is set up, allocating said virtual circuit to one of said output channel groups, and
    at transmission time, receiving, at a plurality of input ports of said switch, packets to be transmitted via particular ones of said channel groups, assigning through use of centralized coordination means in communication with said plurality of input ports at least some of said packets to individual output channels in the particular channel groups, and routing at least some of said packets through said switch to the assigned individual output channels.

4. The method of claim 3 wherein said assigning step comprises the step of identifying packets addressed to the same output channel group.

5. The method of claim 3 wherein said assigning step comprises the step of computing an index corresponding to an individual output channel for at least some of said packets.

6. A method for allocating bandwidth in a packet switch having output channels organized into channel groups, said method comprising the steps of:
    at the time a virtual circuit passing through said switch is set up, allocating said virtual circuit to one of said output channel groups, and
    at transmission time, receiving, at a plurality of input ports of said switch, packets to be transmitted via particular ones of said channel groups, assigning at least some of said packets to individual output channels in the particular channel groups, and routing at least some of said packets through said switch to the assigned individual output channels,
    wherein said assigning step comprises the step of identifying packets addressed to the same output channel group, and
    wherein each of said output channels has an address, the address of each output channel group is the address of a group leader channel, and said assigning step further comprises assigning offsets to packets addressed to the same channel group, each offset corresponding to the differences between a particular group leader address and the address of an individual output channel.

7. The method of claim 6 wherein said routing step further comprises routing at least some of said packets through a self-routing network to said assigned individual output channels.

8. The method of claim 6 wherein said routing step further comprises routing at least some of said packets through a Batcher-banyan network to said individual output channels.

9. A packet switch comprising:
    a plurality of output channels arranged in groups,
    a plurality of input ports for receiving packets containing information serving to identify particular output channel groups,
    centralized output channel assignment means in communication with said plurality of input ports for assigning to said packets individual output channels in said particular output channel groups and for resolving conflicts when the number of said packets simultaneously containing information which serves to identify a particular channel group exceeds the number of channels in said group, and
    routing means for routing at least some of said packets to said individual output channels.

10. The packet switch of claim 9 wherein said routing means comprises a Batcher network followed by a banyan network.

11. The packet switch of claim 9 wherein each of said output channels has an address and the address of each output channel group is the address of a group leader channel.

12. The packet switch of claim 11 wherein said output channel assignment means comprises a first sub-network for identifying packets containing information serving to identify the same output channel group.

13. The packet switch of claim 9 wherein said channel assignment means comprises means for computing an index for each packet, at least some of said indices corresponding to individual output channels in said groups.

14. A packet switch comprising:

a plurality of output channels arranged in groups, means for receiving packets containing information serving to identify particular output channel groups, output channel assignment means for assigning to said packets individual output channels in said particular output channel groups, and routing means for routing said packets to said individual output channels, wherein each of said output channels has an address and the address of each output channel group is the address of a group leader channel, wherein said output channel assignment means comprises a first sub-network for identifying packets containing information serving to identify the same output channel group, and wherein said first subnetwork comprises a plurality of comparators.

15. A packet switch comprising:

a plurality of output channels arranged in groups, means for receiving packets containing information serving to identify particular output channel groups, output channel assignment means for assigning to said packets individual output channels in said particular output channel groups, and routing means for routing said packets to said individual output channels, wherein each of said output channels has an address and the address of each output channel group is the address of a group leader channel, wherein said output channel assignment means comprises a first sub-network for identifying packets containing information serving to identify the same output channel group, and wherein said output channel assignment means further comprises a second subnetwork for assigning offsets to packets containing information identifying the same channel group, each offset corresponding to the difference between a particular group leader address and the address of an individual output channel.

16. The packet switch of claim 15 wherein said second sub-network is a running adder sub-network.

17. A packet switch comprising:

a plurality of output channels arranged in groups, means for receiving packets containing information serving to identify particular output channel groups, output channel assignment means for assigning to said packets individual output channels in said particular output channel groups, and routing means for routing said packets to said individual output channels, wherein each of said output channels has an address and the address of each output channel group is the address of a group leader channel, and wherein said channel assignment means comprises means for assigning offsets to said packets, each offset identifying the difference between a particular group leader address and the address of an individual output channel.

18. A method for switching data packets in a packet switch having a plurality of output channels arranged in groups, said method comprising:

receiving at said switch a plurality of data packets each containing information corresponding to the address of a desired output channel group, generating for each data packet a request packet containing the desired output channel group, computing an index for each request packet which can be used to determine whether or not the corresponding data packet can be accommodated in the desired output channel group, and routing those data packets which can be accommodated in the desired output channel groups through said switch to individual output channels in the desired groups.

19. The method of claim 18 wherein said packets are transmitted synchronously through said switch to said individual output channels.

20. The method of claim 18 wherein said indices are utilized to identify said individual output channels.

21. A method for switching data packets in a packet switch having a plurality of output channels arranged in groups, said method comprising:

receiving at said switch a plurality of data packets each containing information corresponding to the address of a desired output channel group, generating for each data packet a request packet containing the desired output channel group, computing an index for each request packet which can be used to determine whether or not the corresponding data packet can be accommodated in the desired output channel group, and routing those data packets which can be accommodated in the desired output channel groups through said switch to individual output channels in the desired groups, wherein said computing step further comprises the steps of sorting said request packets according to desired output channel group, identifying request packets having the same desired output channel group and generating signals indicative thereof, and obtaining running sums of said signals to provide said indices.

22. A method for routing data packets through a packet switch having a plurality of output channels organized into groups, each of said data packets containing an address to a desired output channel group, said method comprising generating a request packet for each data packet containing the address of the desired output channel group, computing for each request packet an index for spreading data packets addressed to the same channel group over the individual channels comprising the group and for identifying data packets that cannot be accommodated in the desired channel group, and routing those data packets which can be accommodated in the desired channel group to the individual channels identified by said indices.

* * * * *

UNITED STATES PATENT AND TRADEMARK OFFICE
CERTIFICATE OF CORRECTION

PATENT NO. : 4,870,641

DATED : September 26, 1989

INVENTOR(S) : Archille Pattavina

It is certified that error appears in the above-identified patent and that said Letters Patent is hereby corrected as shown below:

Column 3, line 36, "destination" should read --destinations--.
Column 6, line 38, "function" should read --functions--.
Column 10, line 15, "(=0...N-1)" should read --(i=0...N-1)--;
           line 30, "to that" should read --so that--.
Column 11, line 65, "$2^2$" should read --$2^S$--.

Signed and Sealed this

Nineteenth Day of April, 1994

Attest:

BRUCE LEHMAN

*Attesting Officer*     *Commissioner of Patents and Trademarks*